US006461156B2

(12) United States Patent
Kumazawa et al.

(10) Patent No.: US 6,461,156 B2
(45) Date of Patent: Oct. 8, 2002

(54) FIRING SETTERS AND PROCESS FOR PRODUCING THESE SETTERS

(75) Inventors: Takeshi Kumazawa, Handa (JP); Yoshiyuki Sensui, Handa (JP); Mikichika Haga, Handa (JP); Yoshiaki Hayashi, Hirakata (JP)

(73) Assignees: Mino Yogyo Co., Ltd., Mizunami (JP); Motoyama Co., Ltd., Osaka (JP)

( * ) Notice: Subject to any disclaimer, the term of this patent is extended or adjusted under 35 U.S.C. 154(b) by 0 days.

(21) Appl. No.: 09/938,590

(22) Filed: Aug. 27, 2001

(65) Prior Publication Data

US 2002/0042984 A1 Apr. 18, 2002

(30) Foreign Application Priority Data

Aug. 28, 2000 (JP) ....................................... 2000-256982

(51) Int. Cl.[7] ............................ C04B 35/64; F27D 3/12
(52) U.S. Cl. ........................................ 432/261; 432/258
(58) Field of Search ................................ 432/253, 258, 432/261; 118/728; 392/418

(56) References Cited

U.S. PATENT DOCUMENTS 4,594,106 A * 6/1986 Tanaka et al. ............. 106/1.12

FOREIGN PATENT DOCUMENTS

| | | | |
|---|---|---|---|
| JP | 5-178673 | * | 7/1993 |
| JP | 11-79853 | * | 3/1999 |
| JP | 11-240769 | * | 9/1999 |

* cited by examiner

*Primary Examiner*—Jiping Lu
(74) *Attorney, Agent, or Firm*—Oblon, Spivak, McClelland, Maier & Neustadt, P.C.

(57) ABSTRACT

A firing setter, which is useful for a heat treatment or firing step upon production of ceramic-based electronic device components or production of metal-based components obtained by injection molding, is provided with plural trough-holes and has an alumina content of at least 70 wt. %. Each of the through-holes is linear with substantially the same inner diameter along a length thereof and has an inner diameter of from 0.3 to 1 mm. A process for producing the firing setter is also disclosed.

16 Claims, 7 Drawing Sheets

FIRING SETTERS AND PROCESS FOR PRODUCING THESE SETTERS

BACKGROUND OF THE INVENTION a) Field of the Invention

This invention relates to firing setters (hereinafter simply called "setters") useful upon heat treating or firing (hereinafter collectively called "firing") ceramic-based electronic device components, led by capacitors, piezoelements and ferrite elements, or high-precision metal-based components produced by injection molding, and also to a process for producing these setters.

b) Description of the Related Art

In recent years, thin ceramic films of various characteristics have been developed, resulting in a wide variety of electronic devices. Illustrative of known ceramic-based electronic device components are ceramic capacitors and multilayer ceramic capacitors (chip capacitors), which make use of dielectric ceramics; piezoelectric transducers and piezoelectric sensors, which make use of piezoceramics; and ceramic actuators (solid-state displacement elements) such as motors and oscillators. They are expected to find a great variety of utility. These electronic devices are formed of ceramic members, for example, in the form of very thin films (tapes or sheets) on the order of micrometers. By using these films singly or stacking them into multilayered structures, electronic devices equipped with various characteristics have been produced. Taking a representative ceramic capacitor as an example, a description will now be made. This capacitor is formed of a member, which consists of barium titanate ($BaTiO_3$) as a principal component and various auxiliary components added to impart characteristics as desired, and electrodes. As an electrode material, palladium, silver, nickel, copper or the like is selectively used depending on the application purpose. Upon production, an organic binder is generally added to a ceramic powder of a desired composition to impart improved processability, followed by forming. In this case, it is necessary to eliminate the organic binder by heat treatment. In some instances, auxiliary components may be calcined beforehand to add them in desired forms to the principal component.

Upon conducting firing or the like of these ceramic-based electronic device components (hereinafter called "electronic device components"), tray-shaped setters have been used conventionally from the standpoint of productivity to carry electronic device components. Specific examples of such setters include setters obtained by thermally spraying zirconia onto refractories as bases, each of said refractories containing as a primary phase alumina or alumina-silica (mullite) having a particle size distribution in a range of from several micrometers to several millimeters, (see JP 61-24225 A) and setters obtained by coating zirconia onto ceramic surfaces of alumina (JP 3-1090 A).

With a view to making improvements in the productivity of electronic device components and also improvements in the quality of products, there is an outstanding demand in recent years for further improvements in steps, such as firing, in the production process of electronic device components. To meet this demand, it is required to more efficiently eliminate an organic binder, which has been added in a large proportion in the forming step of electronic device components as described above, and moreover, to conduct firing or the like while maintaining the coexisting electrode material in a stable state. As a method for improving the productivity, it may be contemplated, for example, to carry electronic device components as many as possible per unit area of a setter. However, loading of electronic device components in a greater number on any one of the conventionally-applied setter described above makes it difficult to achieve an even temperature distribution or to maintain the uniformity of the atmosphere gas. This leads to a potential problem that the electronic device components may not be produced with uniform quality or may be produced with deteriorated quality. Electronic device components are high-function materials and must be free of such a problem. There is, accordingly, an outstanding desire for the development of a setter which can realize permeability high enough to effectively solve the above-described problem.

Examples of conventionally-known setters which show permeability include those making use of porous ceramics produced by impregnating a porous organic material, which has open cells represented by urethane foam or the like, with ceramics; and setters produced by punching a ceramic sheet or by mechanically forming fine perforations upon forming a plastic mass into a desired shape (see JP 11-79853 A). A further production process of a setter has also been proposed, which comprises forming a shaped body with a spherical organic material of several millimeters in diameter, injecting a ceramic slurry into interstices in the thus-obtained shaped body of the organic material, solidifying the ceramic slurry there, and subjecting the shaped body to firing or the like to remove the organic material, thereby obtaining a porous ceramic body having pores (see JP 63-265880 A).

However, the above-described conventional, permeable setters all require a complex production process, so that they are inferior in productivity and are not economical. According to an investigation by the present inventors, pore of each of permeable setters formed by the conventional processes were of various diameters and were not uniform in diameter, and further, the pores so formed were intricately curved in shape. When firing was conducted, for example, by loading electronic device components on the setter, no smooth permeation of the atmosphere gas was feasible. Even if a conventional permeable setter was provided with many pores, permeation of the atmosphere gas from the outside into the inside of the setter or from the inside to the outside of the setter was still insufficient, thereby making it difficult to conduct firing or the like of electronic device components under even and stable conditions at every area inside the setter.

On the other hand, injection molding has been finding utility in recent years for the production of metal-based components which have heretofore been produced by pressing on a press. Use of a plastic mass obtained by mixing an organic binder in a metal powder material permits injection molding. After obtaining an injection-molded green body of a desired shape, the green body is heat-treated to eliminate the organic binder so that a metal-based precision component of a complex shape is obtained. Metal-based precision components obtained by such a process are now finding increasing utility in various fields. Upon production of such metal-based components, heat treatment of injection-molded green bodies is also conducted to eliminate organic binders as in the above-described production of electronic device components. In the heat treatment, setters are also used from the standpoint of productivity. For example, setters made of a refractory material as a base material, primarily, plate-shaped, economical setters are used.

For the firing or the like upon production of metal-based components by injection molding, there is also an outstanding desire for the development of setters, which can eliminate an organic binder at a low temperature in a short time, especially with a view to making an improvement in productivity. It is possible to achieve an improvement in the productivity of metal-based components available by injection molding provided that setters having high permeability can be obtained at low cost.

As has been described in the above, none of the conventional setters—which have been used in firing or the like upon production of electronic device components or metal-based precision components obtained by injection molding —were able to satisfy at the same time a function to highly eliminate organic substances and volatile components and a function required upon firing electronic device components or the like, that is, a function to achieve a uniform temperature distribution, to permit uniform spreading of atmosphere gas inside the setters and to permit an easy (smooth) transfer of gas to the outside. Needless to say, there is not known any economical process for the easy production of setters, which have such excellent functions as described above, at low cost with excellent productivity.

SUMMARY OF THE INVENTION

An object of the present invention is, therefore, to solve the above-described problems of the conventional art and to provide a setter which, when used in a step such as firing performed upon production of electronic device components or the like, can achieve a uniform temperature distribution and even spreading of atmosphere gas inside the setter and an easy transfer of the gas to the outside and can also attain high-efficiency elimination of organic substances and volatile components adhered or remaining on the electronic device components.

Another object of the present invention is to provide a process for easily and economically producing a setter having such excellent functions as described above.

A further object of the present invention is, based on the provision of the excellent setter and its production process as described above, to achieve improvements in the quality of electronic device components or the like and improvements in their productivity and hence to make a contribution to the quality of ceramic-based electronic device components or the like which make use of these components.

The above-described objects can be achieved by the present invention to be described hereinafter. Specifically, the present invention provides a firing setter provided with plural through-holes, said firing setter being useful for a heat treatment or firing step upon production of ceramic-based electronic device components or production of metal-based components obtained by injection molding, wherein the firing setter has an alumina content of at least 70 wt. %, and each of the through-holes is linear with substantially the same inner diameter along a length thereof and has an inner diameter of from 0.3 to 1 mm. The present invention also provides a firing setter as described above, in which the alumina content is 78 to 85 wt. %. This embodiment is suited especially for an application in which the setter is used at elevated temperatures. The present invention also provides a firing setter as described above, in which the alumina content is at least 99 wt. %. This embodiment is suited especially for an application in which a material of the electronic device components is reactive with impurities other than alumina. The present invention also provides a firing setter as described above, in which the firing setter is coated with stabilized zirconia or magnesia at least at a surface thereof where the firing setter may come into contact with the ceramic-based electronic device component or the metal-based components obtained by the injection molding. This embodiment is suited especially for an application in which a material of the electronic device components or the like reacts with a material of the setter.

Further, the present invention also provides a firing setter as described above, in which the firing setter is in a form of a plate provided with plural through-holes therein; a firing setter as described above, in which the firing setter is in a form of a plate provided with plural through-holes therein, and is provided on at least one side thereof with legs which function as spacers; a firing setter as described above, in which the firing setter is in a form of a tray formed of a bottom wall and side walls, and at least one of the bottom wall and side walls is provided with plural through-holes; a firing setter as described above, in which the plural through-holes have an average diameter of from 0.3 to 0.5 mm; and a firing setter as described above, in which the firing setter has a porosity of from 30 to 70 vol. % in a portion where the plural through-holes are arranged.

Moreover, the present invention provides a process for producing any one of the above-described firing setters, which comprises: adding an organic compound to powder, which an alumina content of at least 70 wt. %, to impart plasticity to the powder; forming the thus-plasticized powder into a green body of a desired shape provided with plural through-holes; drying the green body; and firing the thus-dried green body at a temperature of from 1,400 to 1,700° C. The present invention also provides a process as described above, which further comprises provisionally firing the dried green body before the firing. The present invention also provides a process as described above, which further comprises machining the thus-fired body into a desired shape subsequent to firing at a temperature of from 1,400 to 1,700° C. The present invention also provides a process as described above, in which the organic compound is a polymer having a weight average molecular weight of from 400 to 6,000.

When the setter according to the present invention is used in a heat treatment or firing step of electronic device components or the like, organic substances and volatile components can be eliminated with high efficiency. According to the process of the present invention, the setter can be produced easily and economically. Based on the provision of the excellent setter as described above, the present invention can also achieve stable and high-efficiency production of high-quality electronic device components or the like and at the same time, can make a contribution to the quality and productivity of ceramic-based electronic device products making use of electronic device components or the like.

DETAILED DESCRIPTION OF THE INVENTION AND PREFERRED EMBODIMENTS

The present invention will hereinafter be described in further detail based on preferred embodiments.

Firstly, the term "electronic device components to be carried on the setter of the present invention" means ceramic-made members such as those employed for the formation of various ceramic-based electronic devices, such as the above-exemplified capacitors, piezoelements or ferrite elements, for example, thin ceramic films (tapes or sheets) or ceramic bulks (of a predetermined size) having various characteristics. On the other hand, the term "metal-based precision components available by injection molding and to be carried on the setter of the present invention" means metal-made members obtained by injection molding a material, which has been obtained by adding an organic binder to a metallic material such as stainless steel or titanium, and then firing the thus-molded green bodies. The setter according to the present invention is used in a heat treatment or firing step which is conducted upon production of these members. It is to be noted that the setter according to the present invention has not been developed exclusively for electronic device components having a particular shape or made of a specific material but can be used for a wide variety of products such as ceramic-made function materials or metal-base materials. As high functionality is required for the above-described electronic device components or the like, they are required to be stably supplied especially with reliable, uniform and high quality. Therefore, in the production process of these members, treatment such as firing has to be conducted under uniform conditions and moreover, in a stage such as firing, they should desirably be treated under conditions such that they are completely prevented from undergoing a reaction with a material forming the setter or that they are not contaminated with the setter as impurities. Owing to improvements in the material and shape, the setter of the present invention has solved the above-described problems of the conventional art. A description will hereinafter be made about features of the setter of the present invention.

Figure 1:
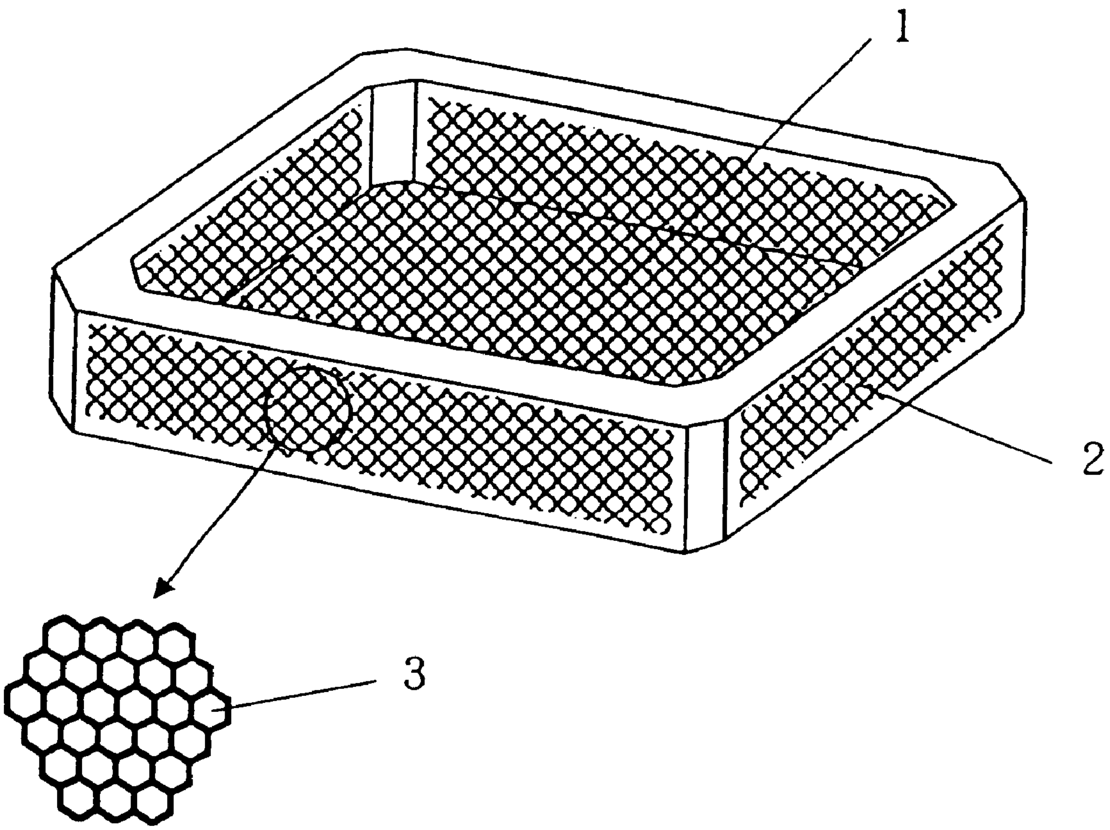
FIG. 1 is a schematic perspective view of a tray-shaped setter according to the present invention.
Figure 5:
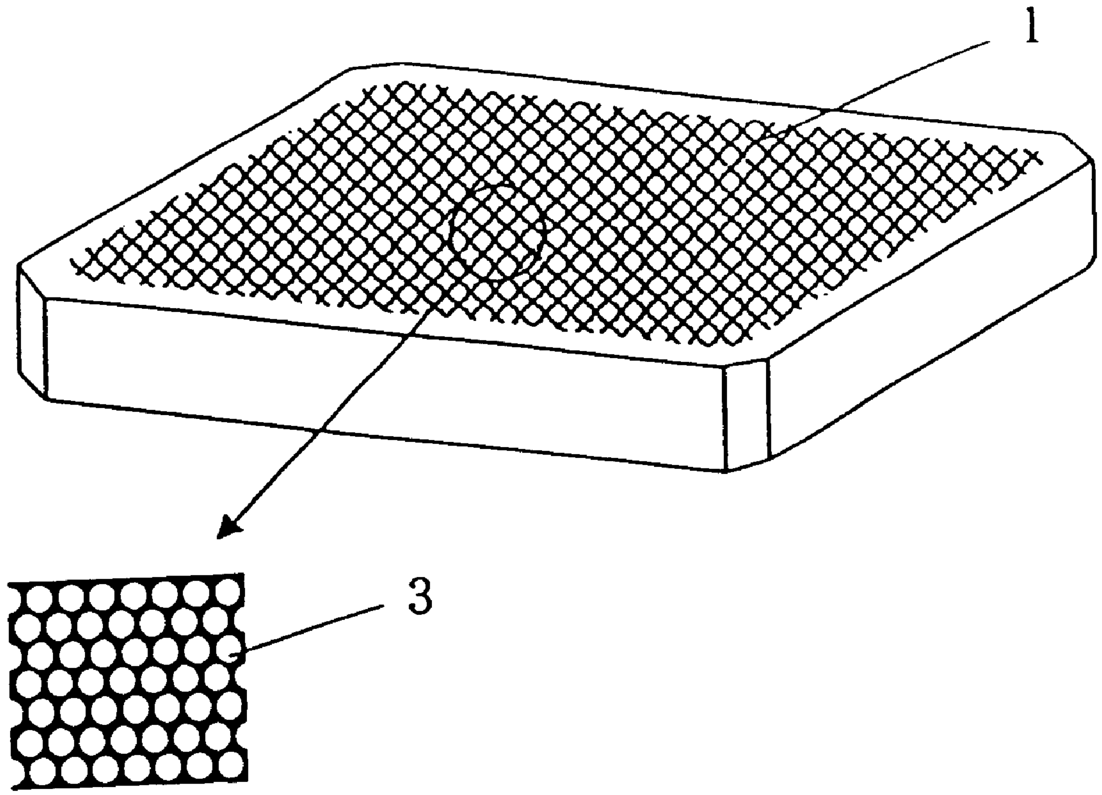
FIG. 5 is a perspective view of an illustrative plate-shaped setter according to the present invention.
Figure 6:
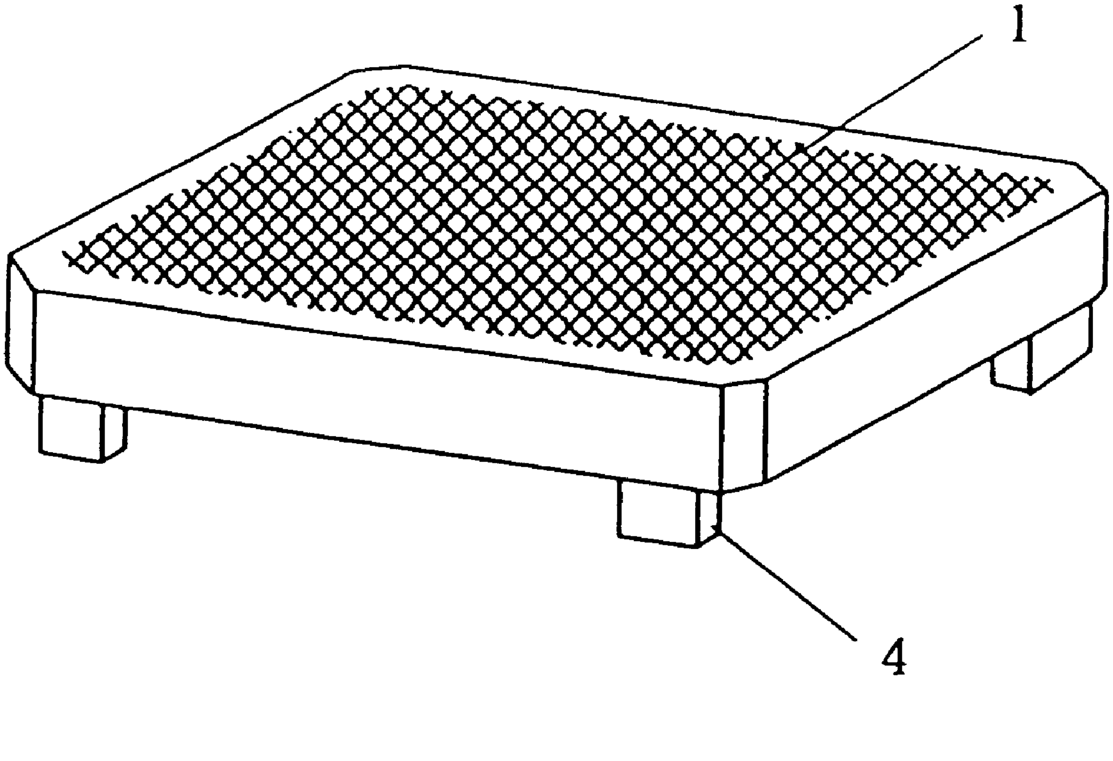
FIG. 6 is a perspective view of another illustrative plate-shaped setter according to the present invention.

The setter according to the present invention is used in firing or the like which is conducted upon production of electronic device components or the like. It can be in the form of a single plate as illustrated in FIG. 5 or in the form of a tray having at least a bottom wall and side walls 2 as depicted in FIG. 1. As a further alternative, it can be in the form of a plate equipped with legs as shown in FIG. 6, which is obtained by forming a plate 1 and then bonding or otherwise attaching legs 4 of a desired shape, which functions as spacers, on at least one side of the plate 1.

FIG. 1 is a schematic perspective view of one example of the tray-shaped setter. The setter according to the present invention is not limited to such a tray shape but can be in any shape insofar as it can carry and hold electronic device components or the like at its carrying section. Illustrative of the tray-shaped setter is one having a bottom wall 1 of a desired shape such as a rectangular or circular shape and side walls 2 of shapes conforming with the bottom wall 1. No particular limitation is imposed on the size of the setter, and the size of the setter can be determined as desired depending on the size and number of electronic device components or the like to be carried inside the setter. As tray-shaped setters can be used in a stacked form, a large number of electronic device components or the like can be subjected to firing or the like at once. Even when used in a stacked form, the setters according to the present invention can achieve a uniform temperature distribution, even smooth flowing of atmosphere gas and a smooth transfer of the gas to the outside owing to their high permeability, thereby making it possible to obtain electronic device components or the like of uniform and high quality with improved productivity without any impairment to their quality.

As another shape of the setter according to the present invention, a setter in the form of a single plate as shown in FIG. 5 can be mentioned. It may be provided with legs as described above (see FIG. 6). Depending on the shape of electronic device components or the like to be subjected to firing or the like, a plate-shaped setter can sufficiently hold the electronic device components or the like. In addition, this plate-shaped setter has merits in that compared with the above-described tray-shaped setter, it has far superior processability and is excellent in economy. If the plate-shaped setter is modified into a plate-shaped setter equipped with legs by attaching or otherwise arranging the legs 4 of a desired shape, which function as spacers, on at least one side of the plate 1, the thus-formed setter can be used in a form stacked with similar setter or setters in much the same way as the above-described tray-shaped setter although it is a plate-shaped setter. Owing to high permeability, these plate-shaped setter equipped with legs can also achieve a uniform temperature distribution and smooth flowing of the atmosphere gas owing to its high permeability, thereby making it possible to obtain electronic device components or the like of uniform and high quality with improved productivity without any impairment to their quality.

The plate-shaped or tray-shaped setter according to the present invention is characterized in that the plate-shaped or tray-shaped setter is provided with plural through-holes in at least portions of the plate-shaped setter, the bottom wall of the tray-shaped setter or the bottom and side walls of the tray-shaped setter, where the plate-shaped or tray-shaped setter comes into contact with electronic device component or the like when the electronic device components or the like are loaded on the plate-shaped setter or on the bottom wall of the tray-shaped setter, and also in that the through-holes have such a shape as will be described next. Each of the through-holes arranged in the setter according to the present invention is linear with substantially the same inner diameter along a length thereof, and the plural through-holes have an average diameter in a range of from 0.3 to 1 mm. Preferably, these through-holes have the same shape, and are arranged to define a so-called honeycomb shape. More preferably, the average diameter of the through-holes is set in a range of from 0.3 to 0.5 mm.

Figure 2:
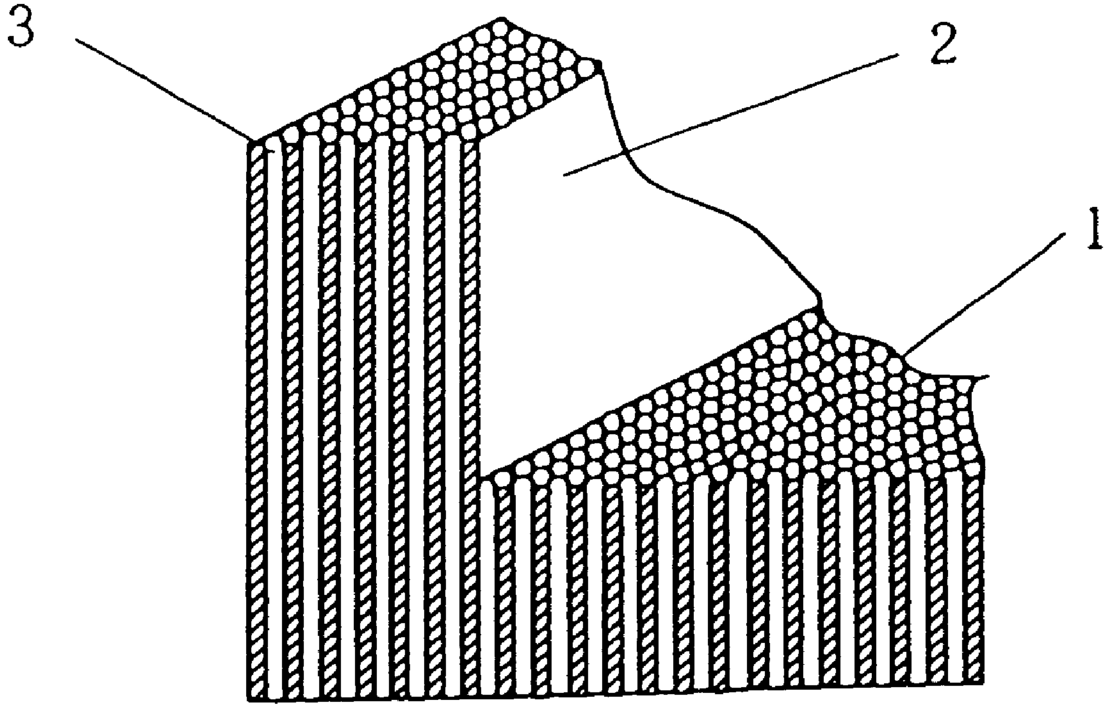
FIG. 2 is a fragmentary perspective view of an illustrative tray-shaped setter according to the present invention, in which parts of its bottom wall and side wall are shown in cross-section.
Figure 3:
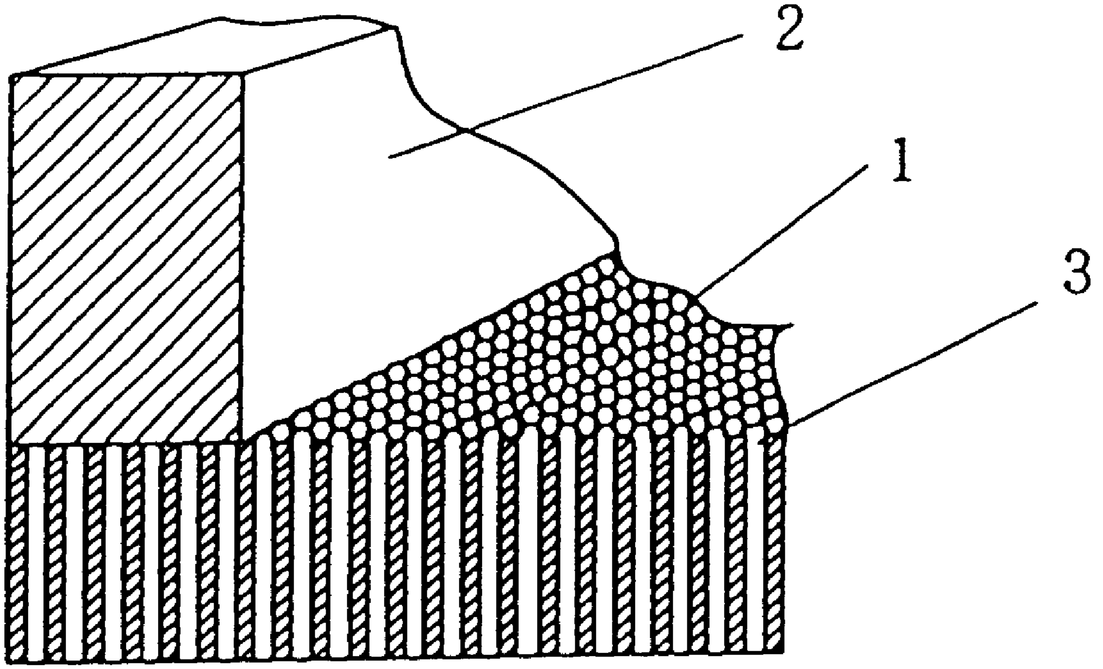
FIG. 3 is a fragmentary perspective view of another illustrative tray-shaped setter according to the present invention, in which parts of its bottom wall and side wall are shown in cross-section.
Figure 4:
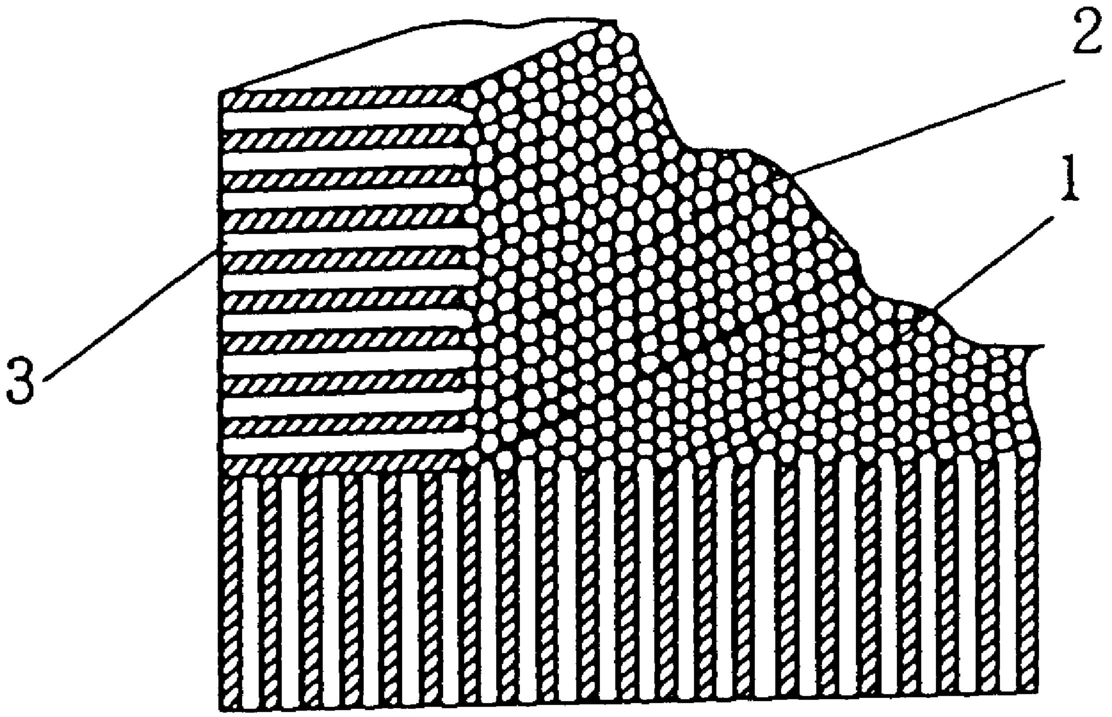
FIG. 4 is a fragmentary perspective view of a further illustrative tray-shaped setter according to the present invention, in which parts of its bottom wall and side wall are shown in cross-section.

With reference to some of the drawings, a description will be made about the through-holes arranged in the setter according to the present invention. When the setter is in the form of a plate as depicted in FIG. 5, it is preferred to arrange through-holes 3 through the upper and lower sides of the plate 1 at substantially the entire areas thereof. When the setter is in the form of a tray, through-holes 3 may be arranged through the upper and lower sides of the bottom wall 1 of the tray at substantially the entire areas thereof as illustrated in FIG. 3, or through-holes 3 may be arranged in both the bottom wall 1 and side wall 2 of the tray as shown in FIG. 2 or 4. In the case of tray-shaped setters, those provided with through-holes 3 in both the bottom walls 1 and side walls 2 thereof are preferred. As is illustrated in FIG. 4, a tray-shaped setter designed such that through-holes 3 are arranged extending toward the inside of the setter, in which electronic device components or the like are to be loaded, is more preferred because more uniform permeability can be realized.

As has been described above, the through-holes in the present invention are arranged preferably through the upper and lower sides of a bottom wall of a plate-shaped setter over the entire areas thereof or through upper and lower sides of a bottom wall of a tray-shaped setter over the entire areas thereof, especially through both sides of each of a bottom wall and a side wall of a tray-shaped setter over the entire areas thereof. This arrangement makes it possible to achieve high permeation not only at the side where electronic device components or the like are loaded, but also throughout the stacked setters. When the setter is used in a firing step or the like, organic substances adhered on or contained in the setter itself as well as organic substances such as oil fat and/or grease adhered on or contained in electronic device components or the like carried on the setter can be promptly eliminated. Further, the setter according to the present invention can achieve higher permeation under far better conditions than the conventional permeable setters so that, when subjecting electronic device components or the like to firing or the like, a more uniform temperature distribution and more even spreading of atmosphere gas can be achieved inside the setter and a smooth transfer of the gas to the outside can also be attained. As a result, electronic device components or the like of higher quality can be stably produced.

The through-holes in the setter of the present invention having such a shape as described above are required to have a diameter not greater than 1 mm to permit supporting thereon electronic device components or the like of very small dimensions, because treatment such as firing of the electronic device components or the like is conducted with the electronic device components or the like loaded on a plate-shaped setter provided with the through-holes or on the bottom wall of a tray-shaped setter, said bottom wall being provided with the through-holes. An unduly small through-hole diameter, however, involves a potential problem that the intended objects of the present invention to achieve even flowing of atmosphere gas and an easy transfer of the gas to the outside may not be achieved. In the present invention, the plural through-holes in the bottom wall and/or the like of the setter are therefore formed to have an average diameter of 0.3 mm or greater. Further, it is more preferred to construct each setter such that it has a porosity of from 30 to 70 vol. % in a portion where such through-holes are arranged.

The setter according to the present invention having such a shape as described above is also characterized in that the setter has an alumina content of at least 70 wt. %. Depending on the use conditions for the setter, a setter having an alumina content of from 78 to 85 wt. % or a setter having an alumina content of 99 wt. % or higher is preferred. Described specifically, firstly from the viewpoint of the creep resistance of the setter at elevated temperatures, powder the alumina content of which is at least 70 wt. % is used as a material for forming the setter of the present invention. Depending on the use conditions for the setter, it is preferred to design its raw material as will be described hereinafter. For an application where the setter is used at elevated temperatures, it is preferred to use a raw material which has an alumina content of from 78 to 85 wt. %, is mixed with silica and forms mullite-alumina as a primary phase after firing. If the material of electronic device components or the like to be carried on the setter is reactive with impurities other than alumina, use of a raw material the alumina content of which is 99 wt. % or higher is preferred. In addition to selection of an optimal raw material depending on the use conditions of the setter, it is also preferred, for an application where the material of electronic device components or the like reacts with the material of the setter, to have the setter coated with stabilized zirconia or magnesia at least at a surface where the setter may be brought into contact with the electronic device components or the like.

Specific examples of the setter-forming material can include ceramic powder having an alumina content of 99 wt. % (product of Showa Denko K.K., Tokyo, Japan) and mixed powder having an alumina content of 80 wt. % and a silica content of 20 wt. % and forming mullite-alumina as a primary phase after firing (product of Mino Ceramics Sho ji, Co., Ltd., Gifu, Japan). As particle sizes of these powder materials, it is preferred to use those having an average particle size in a range of from 0.3 to 3 $\mu$m.

Using such a powder material as described above, the setter according to the present invention is formed by the below-described process as a formed product composed of a fired alumina substrate provided with through-holes the average diameter of which is preferably 0.3 to 1 mm, more preferably 0.3 to 0.5 mm. The specific diameter of the through-holes can be determined depending upon the size of electronic device components or the like to be loaded on the setter. It is preferred to form all of these through-holes evenly as linear through-holes of substantially the same diameter. To achieve this, it is preferred to add an organic compound, such as that to be described subsequently herein, to such a powder material as described above as needed to impart plasticity to the powder material, to extrude the resultant plastic mass into a green body through a die having linear through-holes of substantially the same diameter in a range of from 0.3 to 1 mm in a honeycomb pattern (see an enlarged part in FIG. 1) such that the green body can be formed in a desired shape, and then firing the green body to form a setter. Incidentally, the through-holes may have any desired cross-sectional shape such as a rectangular, polygonal, circular or oval shape.

The organic compound may be added preferably in a proportion of from 3 to 10 wt. % based on the powder material such as high-purity alumina powder or mixed alumina powder for the formation of alumina-mullite. Any organic compound can be used insofar as it imparts an appropriate degree of plasticity to alumina powder or the like to permit extrusion and also makes it possible to easily form a green body having through-holes of such a shape as described above in a honeycomb pattern. Among such organic compounds, particularly preferred are organic compounds each of which has an adequate molecular weight and does not remain as an organic substance within a setter after firing a green body having through-holes to obtain the setter Specifically, it is preferred to use an organic compound which has a weight average molecular weight in a range of from 400 to 6,000 and has properties such that it melts and shows an appropriate degree of viscosity when heated and does not remain after heated or fired. As such an organic compound, it is preferred to use a polyester or cellulose derivative containing many oxygen atoms in its molecule, a polyethylene oxide or polypropylene oxide of an appropriate polymerization degree, or a polyether obtained by copolymerizing ethylene oxide with propylene oxide at a desired ratio.

Polyether (industrial polyglycol) is widely used as nonionic surfactant, lubricant, hydraulic fluid and the like. It can be synthesized, for example, by mixing propylene oxide and ethylene oxide at a desired ratio and copolymerizing them in the presence of a dihydric alcohol such as ethylene glycol or propylene glycol or a trihydric alcohol such as glycerin or pentaerythritol as an initiator. Such polyether can be obtained with various physical properties by selecting these synthesis materials as desired. Polyether is particularly preferred, because a specific polyether having good physical properties suited for the application purpose of the setter according to the present invention can be selected and used as desired. Described specifically, incorporation of an appropriate polyether in alumina powder or the like provides plasticity suitable for extrusion when heated to an adequate temperature and moreover, the resulting green body with through-holes formed therein has strength sufficient to retain its shape. Therefore, the subsequent firing work of the green body can be performed well.

According to the process of the present invention, a setter having a desired shape such as the above-described plate or tray shape can be produced by using a green body having through-holes and obtained as described above, for example, as will be described next. Firstly, the green body is dried at about 30 to 80° C. The dried green body is machined into a desired setter shape such as a plate or tray shape. The thus-machined green body is then fired at 1,400 to 1,700° C. to produce a setter. As an alternative process, the green body is firstly fired at 1,400 to 1,700° C. The resultant, fired product is then machined into a desired setter shape such as a plate or tray shape. The former process is excellent in machinability and makes it possible to more easily obtain a setter of a desired shape. Production by the latter process, on the other hand, has a merit in that higher machining accuracy and shape design tolerance can be enjoyed although the latter process is inferior in machinability to the former process.

As described above, the fired product machined as described above and made of alumina may preferably be coated with stabilized zirconia or magnesia at least at a surface thereof, where the setter may come into contact with electronic device component or the like loaded thereon during use, if the setter and the electronic device components or the like react with each other. When coated as described above, it is possible to effectively prevent electronic device components or the like from reacting with the setter upon subjecting them to firing or the like. As a coating process, it is preferred to prepare a slurry of stabilized zirconia or magnesia powder dispersed in water, to apply the thus-prepared slurry onto a desired part of the setter by dipping the setter in the slurry or spraying the slurry onto the setter, and then to sinter the thus-applied slurry on the setter at a temperature of about 1,400° C.

The present invention will hereinafter be described more specifically based on Examples and Comparative Examples.

EXAMPLE 1

In this Example, alumina powder having an average particle size of 0.5 μm and a purity of 99 wt. % was used as a raw material. As an organic compound to be incorporated in the powder, was employed a polyether which had been obtained by mixing propylene oxide and ethylene oxide at a desired ratio and copolymerizing them in the presence of glycerin as an initiator and had a weight average molecular weight of 3,000. The copolymer was added at a proportion of 5 wt. % in the alumina powder, followed by mixing and kneading in an extruder to impart plasticity. Using a kneaded mass obtained as described above, a green body provided with plural through-holes in a honeycomb pattern was formed by the extruder. Each of the through-holes was linear and its cross-sectional shape was a circle of 0.7 mm in diameter. After drying, the green body was heated at a ramp-up rate of 60° C. /hour to 1,550° C., at which the green body was fired for 120 minutes to obtain a fired alumina member. The thus-obtained, fired alumina member was next cut and ground into a setter having such a tray shape as illustrated in FIG. 1 and provided with through-holes in its side wall and bottom wall as shown in FIG. 2.

On the side, a slurry of yttria-stabilized zirconia dispersed in water to give a desired concentration (50 wt. %) was prepared as a coating material for preventing a reaction with electronic device components. The fired alumina member machined in the setter shape as described above was dipped in the above-described slurry to form a coating layer of zirconia on a surface of the alumina member. Firing was then conducted at 1,400° C. to sinter the coating layer, whereby a tray-shaped setter of this Example was obtained. The thus-obtained setter had a porosity of about 60% in a portion thereof where through-holes were arranged. In that portion, a plurality of linear through-holes of substantially the same diameter had been formed in a honeycomb pattern.

Using the setter of this Example produced as described above and for the sake of comparison, Commercial Products 1–3 which were tray-shaped, zirconia-coated setters available on the market, heat treatment of barium-titanate-base, ceramic bodies formed in the shape of tapes as electronic device components was conducted by loading them in the same number on the respective setters. The ramp-up rate of the heat treatment was set at 30° C./hour. Elimination rates of contained organic substances by the respective setters when heated in the surrounding atmosphere were compared at heating temperatures in different stages. The results are presented in Table 1. As the commercial setters, the following setters were used. The Commercial Product 1 was a porous setter obtained by mixing organic beads in a ceramic powder and then hot-pressing the resultant mixed ceramic powder such that the contained organic beads were eliminated to give a porous body, and was reduced in weight and improved in energy efficiency. The Commercial Product 2 was a porous setter obtained by sintering ceramic fibers. On the other hand, the Commercial Product 3 is a setter formed of a refractory material as a base material, and features low cost and high strength.

TABLE 1

Comparison in Elimination Rates (%)* of Contained Organic Substances

| | Heating temperature (° C.) | | | | | |
|---|---|---|---|---|---|---|
| | 100 | 200 | 300 | 400 | 500 | 600 |
| Example 1 | 0.5 | 1.2 | 3.5 | 3.5 | 3.5 | 3.5 |
| Commercial Product 1 | 0.1 | 0.6 | 1.4 | 2.2 | 2.8 | 3.4 |
| Commercial Product 2 | 0.3 | 0.7 | 1.8 | 2.6 | 3.2 | 3.5 |
| Commercial Product 3 | 0.1 | 0.4 | 0.9 | 1.8 | 2.4 | 2.9 |

*Maximum elimination rate of contained organic substances: 3.5%.

As is apparent from Table 1, the use of each of the setters of the Commercial Products 1–3 showed substantially the same elimination rate as the calculated value at the heating temperature of 600° C. while the use of the setter of Example 1 showed the calculated value of 3.5% of contained organic substances at a heating temperature as low as 300° C. As a result, it has been confirmed that use of the setter of this Example can completely eliminate organic substances, which are adhered on or contained in electronic device components, at temperatures lower than use of conventional setters.

EXAMPLE 2

Using the same 99 wt. % purity alumina powder and organic compound as those used in Example 1, a green body having through-holes was formed in a similar manner as in Example 1. The green body was cut into a plate similar to the bottom wall of the tray-shaped setter illustrated in FIG. 1. On the side, side walls having no through-holes were formed with alumina ceramics which showed a similar firing shrinkage rate as the alumina ceramic used for the plate. The thus-obtained side walls and the plate obtained beforehand as a side wall were joined into an integral body and then fired, whereby a tray-shaped setter having through-holes only through the entire upper and lower sides of the bottom wall such as that shown in FIG. 3 was formed. A zirconia slurry similar to that employed in Example 1 was next coated onto a surface of the tray-shaped setter by spray coating. Firing was then conducted at 1,400° C. to sinter the coating layer, whereby a tray-shaped setter of this Example having through-holes only through its bottom wall was obtained.

Using the setter of this Example produced as described above and commercially-available zirconia-coated setters, barium-titanate-base ceramic bodies similar to those employed in Example 1 were loaded on the respective setters, and were then fired while controlling the atmosphere such that in a certain temperature range during the heating, the atmosphere changed from an oxidizing atmosphere to a reducing atmosphere. A comparison was then made in the contents of residual carbon after the firing. As the commercially-available zirconia-coated setters used for the sake of comparison, setters similar to the Commercial Products 1–3 employed in Example 1 were used. The firing temperature was set at 1,300° C. It is to be noted that the above-described barium-titanate-base products are generally required to have a residual carbon content not higher than about 0.5%.

As a result, the contents of residual carbon when the setters of the Commercial Products 1–3 were used were all 1.5% or higher and were found to dissatisfy the target value of 0.5%. When the Commercial Product 2 was used, the highest residual carbon content of 3.4% was indicated. In contrast, the use of the setter of Example 2 gave a content of residual carbon as low as 0.3%, which well satisfied the target residual carbon content. As a result, it has been confirmed that use of the setter of this Example assures even spreading and easy transfer of atmosphere gas even when firing is conducted while controlling the atmosphere gas such that in a certain temperature range during the heating, the atmosphere gas changes from an oxidizing atmosphere to a reducing atmosphere.

EXAMPLE 3

Employed as a raw material in this Example was powder having an alumina content of 80 wt. % and a silica content of 20 wt. % such that mullite-alumina is formed as a primary phase after firing. The powder had an average particle size of 1.5 μm. In a similar manner as in Example 1 except for the raw material and its average particle size, a green body having through-holes was formed and then fired. The green body was then cut into dimensions of a bottom wall and a side wall to form a tray-shaped setter similar to that shown in FIG. 1, so that plate-shaped members were formed, respectively. Those plate-shaped members so obtained were joined together with a mullite-base adhesive and were then heated to fixedly secure them together, whereby a tray-shaped setter similar to that illustrated in FIG. 1 was formed. Upon joining the plate-shaped members together, the individual members were adhered in directions such that, as is illustrated in FIG. 1, the through-holes are arranged extending from the inside toward the outside of the setter and the through-holes are arranged over substantially the entire sides of the bottom wall and side walls.

A zirconia slurry similar to that employed in Example 1 was coated onto a surface of the tray-shaped setter by spray coating. Firing was then conducted at 1,400° C. to sinter the coating layer, whereby a tray-shaped setter of this Example having through-holes extending from the inside toward the outside of the setter was obtained (see FIG. 4).

Figure 7:
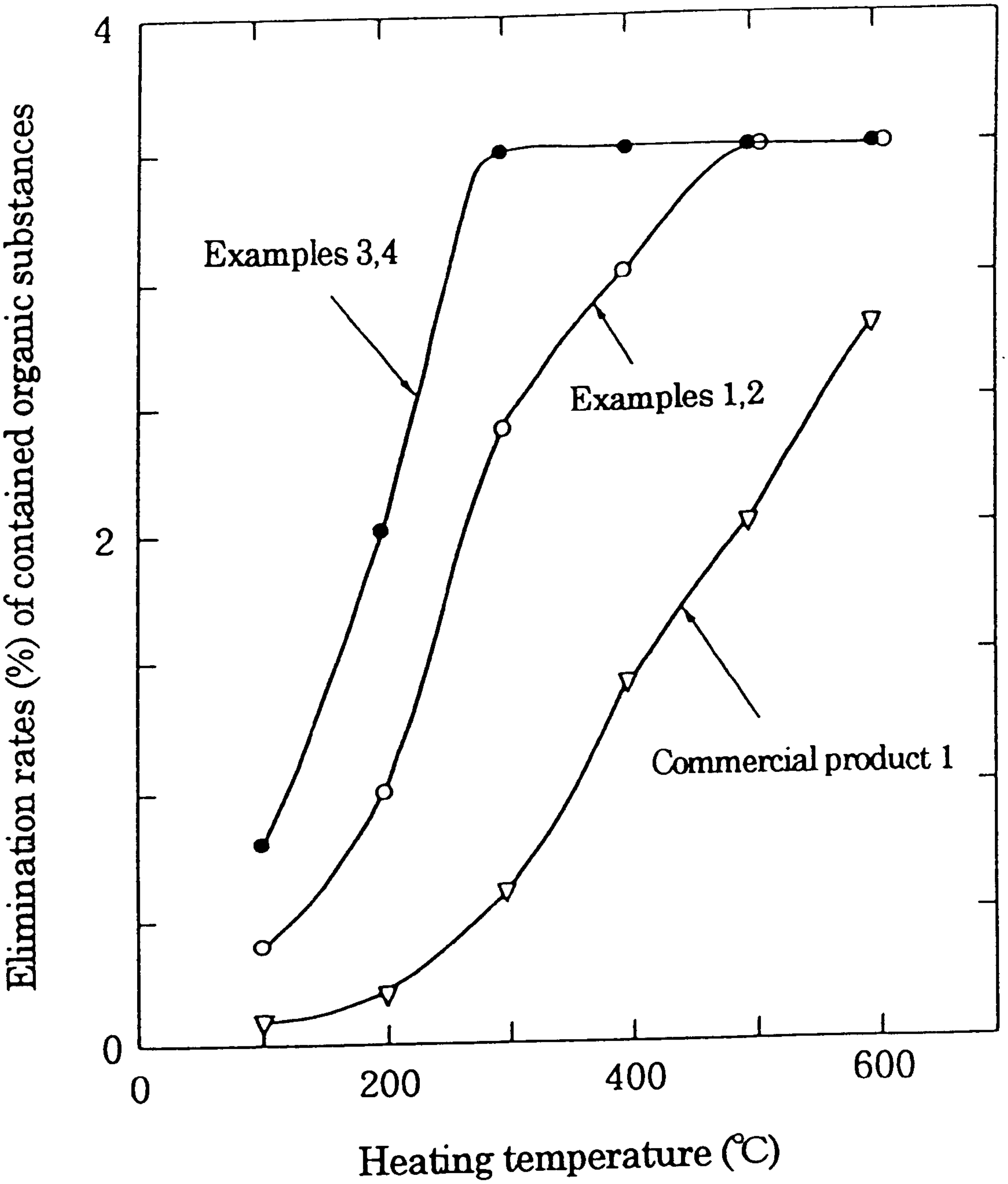
FIG. 7 is a graphic representation showing differences in the elimination rate of contained organic substances as a function of heating temperature when setters of Examples and Comparative Examples were used.

Using barium-titanate-base ceramic bodies similar to those employed in Example 1, heating was conducted from room temperature to 600° C. to investigate variations in the elimination rate of contained organic substances under the below-described conditions. In that test, the setters of Examples 1–3 and for the sake of comparison, the porous setter of the Commercial Product 1 employed in Example 1 were used. The barium-titanate-base ceramic bodies were loaded on the respective setters, and were then fired with dense and non-permeable alumina plates placed as covers on the respective setters. The results are illustrated in FIG. 7. When the Commercial Product 1 was used, the elimination rate of contained organic substances did not reach the calculated value of 3.5% even when heat-treated at 600° C. In contrast, the setters of Examples 1 and 2 showed exactly the same variations in the elimination rate of contained organic substances, reaching 3.5% when heated at 500° C. When the setter of Example 3 was used, on the other hand, the elimination rate of contained organic substances reached 3.5% when heated at 300° C. Despite the covering of the setter of Example 3 at the top thereof with the dense alumina plate, the setter showed an elimination rate of contained organic substances as high as 3.5% at a temperature as low as 300° C. as in the heating with the top kept open in Example 1. It has, therefore, been confirmed that the setter of Example 3 can achieve very efficient elimination of organic substances.

EXAMPLE 4

Using similar materials as in Example 1, a green body having through-holes was formed in a similar manner as in Example 1. The green body was cut into a plate shape and then fired, whereby a plate-shaped setter composed of a single plate and having through-holes through substantially the entire upper and lower sides of the plate as illustrated in FIG. 5 was obtained. A zirconia slurry similar to that employed in Example 1 was next coated onto a surface of the plate-shaped setter by spray coating. Firing was then conducted at 1,400° C. to sinter the coating layer, whereby a plate-shaped permeable setter of this Example was obtained.

Using the plate-shaped setter of this Example obtained as described above, barium-titanate-base ceramic bodies similar to those employed in Example 1 were loaded on the plate-shaped setter and then heated from room temperature to 600° C. to investigate variations in the elimination rate of contained organic substances in a similar manner as in Example 3. As a result, with the plate-shaped setter of this Example, good elimination of contained organic substances was also observed from low temperatures as in the case of the tray-shaped setters of Examples 1–3. Incidentally, similar results were also obtained when a coating was applied by dipping a similar plate-shaped setter in a zirconia slurry instead of the above-described spray coating.

What is claimed is:

1. A firing setter provided with plural through-holes, wherein the firing setter has an alumina content of at least 70%;

each of the through-holes is linear with substantially the same average inner diameter along a length thereof and has an average inner diameter of from 0.3 to 1 mm; and the firing setter is produced by a process comprising extruding a plasticized powder to form a green body, drying the green body, and firing the dried green body.

2. The firing setter according to claim 1, wherein the alumina content is 78 to 85 wt %.

3. The firing setter according to claim 1, wherein the alumina content is at least 99 wt %.

4. The firing setter according to claim 1, further comprising a coating of stabilized zirconia or magnesia on at least at one surface of the firing setter.

5. The firing setter according to claim 1, wherein the firing setter is in a form of a plate provided with plural through-holes therein.

6. The firing setter according to claim 1, wherein the firing setter comprises a plate provided with plural through-holes, and legs on at least one side of the plate.

7. The firing setter according to claim 1, wherein the firing setter is in a form of a tray including a bottom wall and a side wall, and at least one of the bottom wall and side wall is provided with plural through-holes.

8. The firing setter according to claim 1, wherein the plural through-holes have an average diameter of from 0.3 to 0.5 mm.

9. The firing setter according to claim 1, where the firing setter comprises a plate provided through-holes, and the firing setter has a porosity of from 30 to 70 vol. % in a portion where the plural through-holes are arranged.

10. The firing setter according to claim 1, wherein the process for producing the firing setter further comprises:

adding an organic to a powder comprising at least 70 wt. % alumina to form the plasticized powder;

the extruding provides the green body plural through-holes; and the firing is at a temperature of from 1,400 to 1,700° C.

11. The firing setter according to claim 10, wherein the process for producing the firing setter further comprises provisionally firing the dried green body before the firing.

12. The firing setter according to claim 10, wherein the process for producing the firing setter further comprises machining the fired dried green body.

13. The firing setter according to claim 10, wherein the organic compound is a polymer having a weight average molecular weight of from 400 to 6,000.

14. The firing setter according to claim 10, wherein the powder comprises 78 to 85 wt. % alumina.

15. The firing setter according to claim 10, wherein the powder comprises at least 99 wt. % alumina.

16. The firing setter according to claim 10, wherein the process for producing the firing setter further comprises.

coating a water-based slurry of stabilized zirconia or magnesia on at least one surface of the fired dried green body, and then sintering the slurry of stabilized zirconia or magnesia.

* * * * *